United States Patent [19]

Nishimori et al.

[11] Patent Number: 5,318,852
[45] Date of Patent: Jun. 7, 1994

[54] FINE PARTICLES OF CROSSLINKED VINYL POLYMER AND PROCESS FOR PRODUCING THE SAME

[75] Inventors: Tadashi Nishimori; Katsuhiko Rindo; Akira Yoshimatsu, all of Wakayama, Japan

[73] Assignee: Kao Corporation, Tokyo, Japan

[21] Appl. No.: 980,214

[22] Filed: Nov. 23, 1992

[30] Foreign Application Priority Data

Nov. 27, 1991 [JP] Japan ................................. 3-312230

[51] Int. Cl.$^5$ ........................ C08F 212/36; C08F 2/16
[52] U.S. Cl. ................................... 428/402; 526/227; 526/232.1; 526/292.8; 526/298; 526/299; 526/300; 526/336; 526/342
[58] Field of Search ............... 526/336, 227, 232.1, 526/292.8, 297, 298, 299, 300, 342; 428/402

[56] References Cited

U.S. PATENT DOCUMENTS 3,383,336  5/1968  Kuyama et al. ................ 526/336 X Primary Examiner—Fred Teskin
Attorney, Agent, or Firm—Birch, Stewart, Kolasch & Birch

[57] ABSTRACT

Fine particles of a crosslinked vinyl polymer having a very high compressive modulus of elasticity, i.e., above 550 kg/mm$^2$ but not higher than 800 kg/mm$^2$, and being able to be effectively employed as a material capable of maintaining a minute gap constant, and a process for producing the same which comprises polymerizing 100 parts by weight of a vinyl monomer mixture consisting essentially of 20 to 90 parts by weight of m-divinylbenzene, 10 to 60 parts by weight of a vinyl monomer having a nitrile group and 0 to 50 by weight of a vinyl monomer other than m-divinylbenzene and vinyl monomers having a nitrile group in the presence of 3 to 10 parts by weight of a radical polymerization initiator belonging to the organic peroxides, in an aqueous medium.

7 Claims, No Drawings

FINE PARTICLES OF CROSSLINKED VINYL POLYMER AND PROCESS FOR PRODUCING THE SAME

Background of the Invention

1. Field of the Invention

The present invention relates to fine particles of a crosslinked vinyl polymer having a high modulus of elasticity and being suitable for use as a material which maintains a minute gap, and to a process for producing the same.

2. Description of the Related Art

Spacer materials used for maintaining a minute gap constant in a precision instrument and the like are roughly classified into glass materials and plastic materials. Since these spacer materials are usually used in the form of a dispersion in an adhesive resin, plastic materials having a specific gravity close to that of the adhesive resin and an excellent dispersibility are frequently being used.

Fine particles of a polymer obtained by the suspension polymerization of a styrenic monomer and so on have been used as the plastic spacer material.

However, such fine particles of a styrenic polymer which usually have a low mechanical strength become broken or deformed by the pressure applied by the compression, thereby making it impossible to provide a suitable gap. Although crosslinked polymer beads made from a crosslinked monomer have been proposed as a means of overcoming this defect, they are as of yet unsatisfactory, and the development of a plastic spacer material having a high strength is thus in demand.

Hardened, fine spherical particles of a polycondensate resin such as a benzoguanamine/(melanine)/formaldehyde resin have been proposed under these circumstances. Although they have a strength higher than that of ordinary crosslinked polymer beads, they are not fully satisfactory and are disadvantageous in that the production steps are so complicated that their productivity is poor.

Furthermore, European Patent Publication-A No. 0497370/1992 (published on Aug. 5, 1992) and the corresponding U.S. Patent Application Ser. No. 826,528 (now U.S. Pat. No. 5,231,527) (Sharp Kabushiki Kaisha and Kao Corporation), and Japanese Patent Publication-A No. 287127/1991 (published on Dec. 17, 1991) disclosed a spacer having a low modulus of elasticity for a liquid crystal display.

DISCLOSURE OF THE INVENTION

Summary of the Invention

After extensive investigations made under these circumstances, the present inventors have found that fine particles of a crosslinked vinyl polymer having a very high strength can be efficiently obtained in an easy manner by adding a radical polymerization initiator belonging to organic peroxides in an amount far in excess to the ordinary amount thereof to a vinyl monomer mixture comprising m-divinylbenzene and a vinyl monomer having a nitrile group in a specified ratio and then polymerizing them in an aqueous medium. The present invention has been completed on the basis of this finding.

Thus the present invention provides fine particles of a crosslinked vinyl polymer, characterized by having a compressive modulus of above 550 kg/mm$^2$ but not higher than 800 kg/mm$^2$ which is determined when the particles are deformed to the extent of 10% of the particle diameter.

Namely, the present invention relates to fine particles of a crosslinked vinyl polymer having a compressive modulus of above 550 kg/mm$^2$ but not higher than 800 kg/mm$^2$, which is determined by applying a load toward the core of a fine particle to compress the fine particle and measuring the load when the diameter of the fine particle at the compressed site is 90% of the diameter of the fine particle before compression.

The fine particles of a crosslinked vinyl polymer advantageously have a compressive modulus of above 550 kg/mm$^2$ but not higher than 800 kg/mm$^2$ on the average.

The fine particles of a crosslinked vinyl polymer comprise preferably, as the constitution monomer, (1) m-divinylbenzene and (2) a vinyl monomer having a nitrile group, or, 20 to 90 parts by weight of (1) m-divinylbenzene, 10 to 60 parts by weight of (2) a vinyl monomer having a nitrile group and 0 to 50 parts by weight of (3) a vinyl monomer other than m-divinylbenzene and vinyl monomers having a nitrile group, provided that the total amount of (1) m-divinylbenzene, (2) a vinyl monomer having a nitrile group and (3) a vinyl monomer other than m-divinylbenzene and vinyl monomers having a nitrile group is 100 parts by weight.

Further, the fine particles of a crosslinked vinyl polymer advantageouly have an average particle diameter of 1 to 20 μm, and/or, a standard deviation of the particle diameter distribution of within 20% based on the average particle diameter.

The present invention also provides a process for producing fine particles of a crosslinked vinyl polymer, which comprises polymerizing 100 parts by weight of a vinyl monomer mixture consisting essentially of 20 to 90 parts by weight of (1) m-divinylbenzene, 10 to 60 parts by weight of (2) a vinyl monomer having a nitrile group and 0 to 50 parts by weight of (3) a vinyl monomer other than m-divinylbenzene and vinyl monomers having a nitrile group in the presence of 3 to 10 parts by weight of (4) a radical polymerization initiator belonging to organic peroxides, in an aqueous medium. The amount of the vinyl monomer (3) is usually from more than 0 to 50 parts by weight.

The present process includes a process for producing the above-described fine particles of a crosslinked vinyl polymer, characterized by using 3 to 10 parts by weight, based on 100 parts by weight of a vinyl monomer mixture of a crosslinkable vinyl monomer mainly comprising m-divinylbenzene with a vinyl monomer having a nitrile group in a weight ratio of the crosslinkable vinyl monomer mainly comprising m-divinylbenzene to the vinyl monomer having a nitrile group of 40/60 to 90/10, of a radical polymerization initiator belonging to organic peroxides and polymerizing the monomers in an aqueous medium.

Further scope and the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE INVENTION

The fine particles of a crosslinked vinyl polymer according to the present invention has a 10% compressive modulus of above 550 kg/mm² but not higher than 800 kg/mm².

The strength of the fine particles of a crosslinked polymer is given in terms of the compressive modulus obtained by applying a load toward the core of each particle until the particle is deformed to an extent of 10% of its diameter (hereinafter referred to as 10% compressive modulus). The 10% compressive modulus of the fine particles is determined by applying a load toward the core of a fine particle to compress the fine particle and measuring the load when the diameter of the fine particle at the compressed site is 90% of the diameter of the fine particle before compression. The average value of the 10% compressive modulus of the fine particles is determined by applying a load toward the core of a fine particle to compress the fine particle, measuring the load when the diameter of the fine particle at the compressed site is 90% of the diameter of the fine particle before compression, and calculating the average value of them.

The term "10% compressive modulus" as used herein refers to a value determined by the following method:

Method of determination of 10% compressive modulus

A load is applied toward the core of one of the sample particles spread on a sample mount with a Shimadzu Fine Particle Compression Tester (PCT-200 mfd. by Shimadzu Corporation) to obtain the load-compressive strain relationship, thus determining the load necessitated for 10% strain, that is, the load when the diameter of the fine particle at the compressed site is 90% of the diameter of the fine particle before compression. This value is substituted in the following formula to calculate the 10% compressive modulus. The operation is conducted at room temperature.

$$E = \frac{3 \times F \times (1 - K^2)}{\sqrt{2} \times S^{1.5} \times \sqrt{R}}$$

wherein E represents 10% compressive modulus (kg/mm²), F represents compressive load (kg), K represents Poisson's ratio of the particle (constant; 0.38), S represents compressive strain (mm), and R represents the radius (mm) of the particle.

The operation described above is repeated for three different particles and the average of the three values is taken as the 10% compressive modulus (average value) of the fine particles.

The 10% compressive modulus of the fine particles of the present invention is above 550 kg/mm² but not higher than 800 kg/mm², particularly above 550 kg/mm² but not higher than 700 kg/mm², whereas that of ordinary crosslinked polystyrenes is as low as 360 kg/mm². Thus, fine particles of a crosslinked vinyl polymer having a very high modulus of elasticity can be provided by the present invention.

The average diameter of the fine particles of a crosslinked polymer according to the present invention, which can be designed depending on the purpose, is usually preferably 1 to 20 μm.

When the fine particles of a crosslinked polymer of the present invention to be used as a spacer have a wide particle diameter distribution, gap unevenness is disadvantageously caused. It is desirable, therefore, that the standard deviation of the particle diameter distribution be within 20%, particularly within 10%, based on the average particle diameter. Therefore, in the use of the fine particles of a crosslinked polymer according to the present invention as a material for maintaining a minute gap, it is desirable to employ those which are classified by levigation or air classification after their production.

The fine particles of a crosslinked vinyl polymer according to the present invention comprises preferably, as the constitution monomer, (1) m-divinylbenzene and (2) a vinyl monomer having a nitrile group, or, 20 to 90 parts by weight of (1) m-divinylbenzene, 10 to 60 parts by weight of (2) a vinyl monomer having a nitrile group and 0 to 50 parts by weight of (3) a vinyl monomer other than m-divinylbenzene and vinyl monomers having a nitrile group, provided that the total amount of (1) m-divinylbenzene, (2) a vinyl monomer having a nitrile group and (3) a vinyl monomer other than m-divinylbenzene and vinyl monomers having a nitrile group is 100 parts by weight.

m-Divinylbenzene (1) and mixtures containing m-divinylbenzene (1) are available on the market. However, divinylbenzene available on the market has a purity of usually about 55 to 80% by weight and thus contains a considerable amount of impurities such as ethylstyrene. Further divinylbenzene per se which is the main component is a mixture of p-divinylbenzene with m-divinylbenze (m-divinylbenzene content: 30 to 40% by weight). Therefore, divinylbenzene available on the market are undesirable, though they are usable in the present invention.

In the present invention, a mixture of crosslinkable vinyl monomers mainly comprising m-divinylbenzene is generally used. The mixture contains at least 50% by weight, preferably at least 70% by weight, based on the weight of the mixture, of m-divinylbenzene. A purer divinylbenzene is preferable for use as the starting material for the fine particles according to the present invention and, in particular, fine particles of a crosslinked polymer having a high modulus of elasticity can be obtained when highly pure m-divinylbenzene is used as the starting material for the fine particles according to the present invention.

The vinyl monomers having a nitrile group (2) to be used in the present invention are not particularly limited so far as they are ordinary, radicalpolymerizable unsaturated nitrile monomers. Examples of such vinyl monomers include acrylonitrile, methacrylonitrile, vinylidene cyanide, α-chloroacrylonitrile, α-bromoacrylonitrile, α-fluoroacrylonitrile, α-chloro-β-difluoroacrylonitrile, α-trifluoromethylacrylonitrile, α-methoxyacrylonitrile, vinyl α-cyanoacetate, α-cyanostyrene, N,N-bis-β-cyanoethylacrylamide, N-methyl-N-(β-cyanoethyl)methacrylamide and N-cyclohexyl-N-(β-cyanoethyl)methacrylamide. These unsaturated nitrile monomers can be used either singly or in the form of a mixture of two or more of them. Acrylonitrile and methacrylonitrile, having a high copolymerizability, are preferably used in the present invention. In particular, fine particles of a crosslinked vinyl polymer having a high modulus of elasticity is obtained when acrylonitrile is used.

The vinyl monomers (3) other than m-divinylbenzene and vinyl monomers having a nitrile group include crosslinkable vinyl monomers other than m-divinylbenzene and noncrosslinkable vinyl monomers other than the vinyl monomers having a nitrile group.

The crosslinkable vinyl monomers other than m-divinylbenzene usable in the present invention are not particularly limited so far as they are crosslinkable monomers having at least two radical-polymerizable double bonds. They include, for example, vinyl compounds such as p-divinylbenzene, 1,4-divinyloxybutane and divinyl sulfone; allyl compounds such as diallyl phthalate, diallyl acrylamide, triallyl (iso)cyanurate and triallyl trimellitate; (poly)oxyalkylene glycol di(meth)acrylates such as (poly)ethylene glycol di(meth)acrylate and (poly)propylene glycol di(meth)acrylate; and pentaerythritol tetra(meth)acrylate, pentaerythritol tri(meth)acrylate, pentaerythritol di(meth)acrylate, trimethylolpropane tri(meth)acrylate, dipentaerythritol hexa(meth)acrylate, dipentaerythritol penta(meth)acrylate, glycerol tri(meth)acrylate and glycerol di(meth)acrylate. These crosslinkable vinyl monomers other than m-divinylbenzene can be used either singly or in the form of a mixture of two or more of them.

The noncrosslinkable vinyl monomers other than the vinyl monomers having a nitrile group may be any radical-polymerizable vinyl monomer other than vinyl monomers having a nitrile group and crosslinkable vinyl monomers. They include, for example, styrenic monomers such as styrene, p-(or m-)methylstyrene, p-(or m-)ethylstyrene, p-(or m-)chlorostyrene, p-(or m-)chloromethylstyrene, styrenesulfonic acid, p-(or m-)-t-butoxystyrene, α-methyl-p-t-amyloxystyrene and p-t-amyloxystyrene; (meth)acrylic ester monomers such as ethyl (meth)acrylate, 2-ethylhexyl (meth)acrylate, lauryl (meth)acrylate, dimethylaminoethyl (meth)acrylate, diethylaminoethyl (meth)acrylate, hydroxyethyl (meth)acrylate, diethylene glycol mono(meth)acrylate, glycerol mono(meth)acrylate, polyethylene glycol mono(meth)acrylate and butanediol mono(meth)acrylate; unsaturated carboxylic acid monomers such as (meth)acrylic acid and maleic acid; alkyl vinyl ethers such as methyl vinyl ether and ethyl vinyl ether; vinyl ester monomers such as vinyl acetate and vinyl butyrate; and N-alkyl-substituted (meth)acrylamides such as N-methyl(meth)acrylamide and N-ethyl(meth)acrylamide. These noncrosslinkable vinyl monomers can be used either singly or in the form of a mixture of two or more of them.

The weight ratio of (1) the m-divinylbenzene to (2) the vinyl monomer having a nitrile group is preferably ⅛ to 9/2, still preferably 2/5 to 9/2, especially preferably ½ to 2/1. That is, when the above-mentioned mixture of crosslinkable vinyl monomers mainly comprising m-divinylbenzene, which contains m-divinylbenzene in an amount of at least 50% by weight, is employed as one of the starting materials, the weight ratio of the mixture of crosslinkable vinyl monomers mainly comprising m-divinylbenzene to the vinyl monomer having a nitrile group is preferably 40/60 to 90/10, still preferably 40/50 to 90/10, especially preferably 50/50 to 80/20.

Alternatively, as the starting materials for the fine particles, 20 to 90 parts by weight, preferably 30 to 80 parts by weight of (1) m-divinyl-benzene, 10 to 60 parts by weight, preferably 20 to 50 parts by weight of (2) a vinyl monomer having a nitrile group and 0 to 50 parts by weight, preferably 0 to 30 parts by weight of (3) a vinyl monomer other than m-divinylbenzene and vinyl monomers having a nitrile group, provided that the total amount of (1) m-divinylbenzene, (2) a vinyl monomer having a nitrile group and (3) a vinyl monomer other than m-divinylbenzene and vinyl monomers having a nitrile group is 100 parts by weight, are advantageously used. The amount of (3) the vinyl monomer other than m-divinylbenzene and vinyl monomers having a nitrile group is not usually 0.

When the relative amount of (2) the vinyl monomer having a nitrile group is below this range, no mixture of fine particles having high strength can be obtained and, on the contrary, when it is above the range, nitrilic copolymer particles obtained have such a high cohesive force that they cohere together to lower the polymerization stability. Also when the relative amount of the m-divinylbenzene is below this range, no mixture of fine particles having high strength can be obtained.

The process according to the present invention comprises the polymerization process of 100 parts by weight of a vinyl monomer mixture consisting essentially of 20 to 90 parts by weight, preferably 30 to 80 parts by weight of (1) m-divinylbenzene, 10 to 60 parts by weight, preferably 20 to 50 parts by weight of (2) a vinyl monomer having a nitrile group and 0 to 50 parts by weight, preferably 0 to 30 parts by weight of (3) a vinyl monomer other than m-divinylbenzene and vinyl monomers having a nitrile group in the presence of 3 to 10 parts by weight, preferably 4 to 7 parts by weight of (4) a radical polymerization initiator belonging to the organic peroxides in an aqueous medium. That is, polymerization of (1) m-divinyl-benzene with (2) a vinyl monomer having a nitrile group and (3) a vinyl monomer other than m-divinyl-benzene and vinyl monomers having a nitrile group is conducted in the presence of (4) a radical polymerization initiator belonging to the organic peroxides in an aqueous medium.

The organic peroxide radical polymerization initiators (4) to be used in the present invention include, for example, benzoyl peroxide and lauroyl peroxide, benzoyl peroxide being particularly preferred. These organic peroxide radical polymerization initiators can be used either singly or in the form of a mixture of two or more of them.

Although the amount of such a radical polymerization initiator was usually 0.1 to 3 parts by weight for 100 parts by weight of the monomer(s) in the prior art, in the present invention, the amount is 3 to 10 parts by weight, preferably 4 to 7 parts by weight to obtain fine particles of a crosslinked vinyl polymer having a very high modulus of elasticity. When the amount of the organic peroxide radical polymerization initiator(s) is below or above this range, no fine particles of a crosslinked polymer having a suitable strength can be obtained. When an azo initiator is used even in a large amount, the modulus of elasticity cannot be significantly improved.

The polymerization in an aqueous medium is conducted according to the ordinary method in the presence of a dispersion stabilizer with stirring at a temperature in the range of 25° to 100° C., preferably 50° to 90° C. in the present invention (suspension polymerization method). Examples of the dispersion stabilizer include surfactants such as sodium lauryl sulfate, sodium laurylbenzenesulfonate and sodium polyoxyethylene lauryl ether sulfate; water-soluble polymers such as gelatin, starch, hydroxyethylcellulose, carboxymethylcellulose, polyvinylpyrrolidone, polyvinyl alkyl ethers and polyvinyl alcohol; and slightly water-soluble inorganic salts such as barium sulfate, calcium sulfate, barium carbonate, calcium carbonate, magnesium carbonate and calcium phosphate.

The fine particles of the crosslinked polymers according to the present invention can be produced by any ordinary method for producing fine polymer particles, such as the seed polymerization method in addition to the suspension polymerization method.

In the use of the fine particles of a crosslinked polymer obtained by the process according to present invention as a material for maintaining a minute gap, it is desirable to classify the fine particles produced by levigation or air classification if the particle diameter distribution thereof is wide.

As described above, the process of the present invention is capable of providing fine particles of a crosslinked polymer having a high modulus of elasticity in spite of a remarkable simplicity of operation. Thus the process can be effectively employed for the production of a material for maintaining a minute gap constant, and so forth.

EXAMPLES

The following Examples will further illustrate the present invention, which by no means limit the invention. In the Examples, parts are given by weight. The starting materials and polymerization initiators used in the Examples each have a purity of about 100% except the case that a purity is mentioned specially.

EXAMPLE 1

A liquid mixture comprising 60 parts of m-divinylbenzene (purity: 92 wt. %, most of the impurities are ethylstyrene, a product of Nissei Kagaku Kogyo K. K.), 40 parts of acrylonitrile (a product of Wako Pure Chemical Industries, Ltd.) and 5 parts of benzoyl peroxide was added to 800 parts of a 3 wt. % aqueous solution of polyvinyl alcohol (GH-17, a product of Nippon Synthetic Chemical Industry Co., Ltd., degree of saponification: 86.5 to 89 molar %) to obtain a fine dispersion, which was stirred in a nitrogen stream at 80° C. for 15 hours to conduct polymerization. The fine particles thus obtained were washed with deionized water and a solvent, classified, separated and dried to obtain fine particles of a crosslinked polymer having an average diameter of 6.0 $\mu$m and a standard deviation of 0.40 $\mu$m.

The 10% compressive modulus (average) of the obtained fine particles of the crosslinked polymer was determined by the above method to be 670 kg/mm$^2$.

EXAMPLE 2

The same procedure as that of the Example 1 was repeated except that 50 parts of m-divinylbenzene (purity: 92 wt. %), 50 parts of methacrylonitrile (a product of Wako Pure Chemical Industries, Ltd.) in place of acrylonitrile and 7 parts of benzyl peroxide were used to obtain fine particles of a crosslinked polymer having an average diameter of 10.3 $\mu$m and a standard deviation of 0.52 $\mu$m.

The 10% compressive modulus (average) of the obtained fine particles of the crosslinked polymer was determined to be 560 kg/mm$^2$.

EXAMPLE 3

The same procedure as that of the Example 1 was repeated except that 80 parts of m-divinylbenzene (purity: 92 wt. %), 20 parts of acrylonitrile and 5 parts of lauroyl peroxide in place of benzoyl peroxide were used to obtain fine particles of a crosslinked polymer having an average diameter of 7.5 $\mu$m and a standard deviation of 0.41 $\mu$m.

The 10% compressive modulus (average) of the obtained fine particles of the crosslinked polymer was determined to be 620 kg/mm$^2$.

EXAMPLE 4

The same procedure as that of the Example 3 was repeated except that 50 parts of m-divinylbenzene (purity: 92 wt. %) and 30 parts of dipentaerythritol hexaacrylate (DPE-6A, a product of Kyoeisha Yushi Kagakukogyo K. K.) were used as the crosslinkable vinyl monomers in place of 80 parts of m-divinylbenzene (purity: 92 wt. %) to obtain fine particles of a crosslinked polymer having an average diameter of 8.2 $\mu$m and a standard deviation of 0.47 $\mu$m.

The 10% compressive modulus (average) of the obtained fine particles was 580 kg/mm$^2$.

COMPARATIVE EXAMPLE 1

The same procedure as that of the Example 1 was repeated except that the amounts of m-divinylbenzene and acrylonitrile were altered to 95 parts and 5 parts, respectively to obtain fine particles of a crosslinked polymer having an average diameter of 6.4 $\mu$m and a standard deviation of 0.44 $\mu$m.

The 10% compressive modulus (average) of the obtained fine particles of the crosslinked polymer was 470 kg/mm$^2$.

COMPARATIVE EXAMPLE 2

Polymerization was conducted according to the same procedure as that of the Example 1 except that the amounts of m-divinylbenzene and acrylonitrile were altered to 30 parts and 70 parts, respectively. The coagulation occurred during the polymerization and no fine particles of the crosslinked polymer were obtained.

COMPARATIVE EXAMPLE 3

The same procedure as that of the Example 1 was repeated except that the amount of benzoyl peroxide was altered to 1 part to obtain fine particles of a crosslinked polymer having an average diameter of 6.5 $\mu$m and a standard deviation of 0.49 $\mu$m.

The 10% compressive modulus (average) of the obtained mixture of fine particles of the crosslinked polymer was 390 kg/mm$^2$.

COMPARATIVE EXAMPLE 4

The same procedure as that of the Example 1 was repeated except that the amount of benzoyl peroxide was altered to 15 part to obtain fine particles of a crosslinked polymer having an average diameter of 6.3 $\mu$m and a standard deviation of 0.43 $\mu$m.

The 10% compressive modulus (average) of the obtained fine particles of the crosslinked polymer was 410 kg/mm$^2$.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What we claim is:

1. Fine particles of a cross-linked vinyl polymer, comprising 20 to 90 parts by weight of m-divinylbenzene, 10 to 60 parts by weight of a vinyl monomer having a nitrile group and 0 to 50 parts by weight of a vinyl monomer other than m-divinylbenzene and vinyl monomers having a nitrile group, provided that the total amount of m-divinylbenzene, the vinyl monomer having a nitrile group and the vinyl monomer other than m-divinylbenzene and vinyl monomers having a nitrile group is 100 parts by weight, wherein said particles have a compressive modulus of above 550 kg/mm$^2$ but not higher than 800 kg/mm$^2$, said compressive modulus being determined by applying a load toward the core of a fine particle and measuring the load when the diameter of the fine particle at the compressed site is 90% of its diameter before compression.

2. The fine particles according to claim 1, wherein said vinyl monomer having a nitrile group is acrylonitrile and/or methacrylonitrile.

3. The fine particles of a crosslinked vinyl polymer according to claim 1, wherein said fine particles have an average particle diameter of 1 to 20 μm.

4. The fine particles of a crosslinked vinyl polymer according to claim 1, wherein said fine particles have a standard deviation of the particle diameter distribution of within 20% based on the average particle diameter.

5. A process for producing fine particles of a crosslinked vinyl polymer, which comprises polymerizing 100 parts by weight of a vinyl monomer mixture consisting essentially of 20 to 90 parts by weight of m-divinylbenzene, 10 to 60 parts by weight of a vinyl monomer having a nitrile group and 0 to 50 parts by weight of a vinyl monomer other than m-divinylbenzene and vinyl monomers having a nitrile group in the presence of 3 to 10 parts by weight of a radical polymerization initiator selected from organic peroxides, in an aqueous medium.

6. The process for producing fine particles of a crosslinked vinyl polymer according to claim 5, wherein the vinyl monomer having a nitrile group is acrylonitrile and/or methacrylonitrile.

7. The process for producing fine particles of a crosslinked vinyl polymer according to claim 5, wherein the radical polymerization initiator is present in an amount of 4 to 7 parts by weight based on 100 parts by weight of the vinyl monomer mixture.

* * * * *